United States Patent
Abe

(10) Patent No.: US 8,664,801 B2
(45) Date of Patent: Mar. 4, 2014

(54) NON-CONTACT POWER SUPPLY SYSTEM

(75) Inventor: Hideaki Abe, Neyagawa (JP)

(73) Assignee: Panasonic Corporation, Osaka (JP)

( * ) Notice: Subject to any disclaimer, the term of this patent is extended or adjusted under 35 U.S.C. 154(b) by 986 days.

(21) Appl. No.: 12/662,548

(22) Filed: Apr. 22, 2010

(65) Prior Publication Data

US 2010/0270867 A1 Oct. 28, 2010

(30) Foreign Application Priority Data

Apr. 22, 2009 (JP) ................................ 2009-104441

(51) Int. Cl.
*H01F 27/42* (2006.01)
*H01F 37/00* (2006.01)
*H01F 38/00* (2006.01)

(52) U.S. Cl.
USPC ............................ 307/104; 307/106; 307/109

(58) Field of Classification Search
USPC ........................................................ 307/104
See application file for complete search history.

(56) References Cited

U.S. PATENT DOCUMENTS

| | | | |
|---|---|---|---|
| 5,706,183 A | 1/1998 | Abe et al. | |
| 5,896,278 A | 4/1999 | Tamura et al. | |
| 6,252,386 B1 | 6/2001 | Minami et al. | |
| 6,351,626 B1 | 2/2002 | Lohr | |
| 6,747,548 B1 | 6/2004 | Yamaguchi | |
| 6,956,450 B1 | 10/2005 | Lohr | |
| 8,031,490 B2 | 10/2011 | Kitamura et al. | |
| 2002/0057584 A1* | 5/2002 | Brockmann | 363/98 |
| 2002/0142723 A1* | 10/2002 | Foschini et al. | 455/59 |
| 2003/0094855 A1 | 5/2003 | Lohr et al. | |
| 2003/0117025 A1* | 6/2003 | Rouquette | 307/147 |
| 2005/0068019 A1* | 3/2005 | Nakamura et al. | 323/355 |
| 2008/0258744 A1* | 10/2008 | Kuroda et al. | 324/750 |
| 2009/0021219 A1 | 1/2009 | Yoda et al. | |
| 2009/0134711 A1* | 5/2009 | Issa et al. | 307/104 |
| 2010/0104031 A1 | 4/2010 | Lacour | |
| 2010/0177537 A1 | 7/2010 | Kitamura et al. | |

FOREIGN PATENT DOCUMENTS

| | | |
|---|---|---|
| CN | 1835327 A | 9/2006 |
| JP | 8-80042 | 3/1996 |
| JP | 10-271713 | 10/1998 |
| JP | 2004-229406 | 8/2004 |

(Continued)

OTHER PUBLICATIONS

Office Action dated Apr. 18, 2013 issued in corresponding Taiwanese application No. 099112679.

(Continued)

*Primary Examiner* — Stephen W Jackson
*Assistant Examiner* — Toan Vu
(74) *Attorney, Agent, or Firm* — Bacon & Thomas, PLLC

(57) ABSTRACT

A non-contact power supply system includes a power supply device for transmitting high frequency power and a load device which receives the high frequency power in a non-contact mode by electromagnetic induction to supply it to a load. The power supply device includes a power transmission unit having a primary power coil and an inverter circuit, an inquiry unit having at least one primary signal coil and an oscillation circuit, a signal detection unit and a control unit. The load device includes a power reception unit having a secondary power coil magnetically coupled to the primary power coil and a power conversion unit, a secondary signal coil magnetically coupled to the primary signal coil, and a response unit which is operated by electromotive force induced in the secondary signal coil. The control unit stops power transmission when no signal is detected and executes power transmission which a signal is detected.

17 Claims, 14 Drawing Sheets

(56) References Cited

FOREIGN PATENT DOCUMENTS

| | | |
|---|---|---|
| JP | 2006-081249 | 3/2006 |
| RU | 2192099 | 10/2002 |
| SU | 1464235 | 3/1989 |
| TW | 422959 | 6/1986 |
| TW | 200913428 | 7/1997 |
| WO | 94/28560 | 12/1994 |
| WO | 99/26329 | 5/1999 |
| WO | 2008/023679 | 2/2008 |
| WO | 2008/125394 | 10/2008 |

OTHER PUBLICATIONS

The Russian Decision on Grant dated Jul. 12, 2011 and English translation thereof.

\* cited by examiner

NON-CONTACT POWER SUPPLY SYSTEM

FIELD OF THE INVENTION

The present invention relates to a non-contact power supply system using electromagnetic induction.

BACKGROUND OF THE INVENTION

Conventionally, electric devices (e.g., an electric shaver, a power toothbrush and a cellular phone) having secondary batteries as a power source are provided with various non-contact power supply systems to contactlessly charge the secondary batteries by using electromagnetic induction.

In a non-contact power supply system, when a primary coil of a power supply device is not magnetically coupled with a secondary coil of an electric device (load device) (a standby mode), an inverter circuit of the power supply device is intermittently driven to suppress power consumption, for example. When the primary coil is magnetically coupled with the secondary coil (a power supply mode), the inverter circuit is continuously driven to supply a large amount of power to the electric device. Further, when a metal foreign substrate is placed in the vicinity of the primary coil of the power supply device, the foreign substrate may be heated by induction heating. Accordingly, coils for signal transmission are provided in both the power supply device and the electric device. The inverter circuit of the power supply device is switched from an intermittent operation mode to a continuous operation mode only when a signal is transmitted from the electric device to the power supply device through the coils for signal transmission, thereby preventing the foreign substrate from being heated (see, e.g., Japanese Patent Application Publication Nos. H10-271713 and H8-80042).

However, in the above-mentioned conventional case, the inverter circuit of the power supply device is intermittently driven even in the standby mode in which power is not transmitted to the electric device. Accordingly, a relatively large amount of power is consumed even in the standby mode. Further, since a signal is transmitted from the electric device via the coil thereof for signal transmission, in the conventional case disclosed in Japanese Patent Application Publication No. H10-271713, an oscillation circuit for oscillating the coil for signal transmission and a second secondary coil which is magnetically coupled with the primary coil of the power supply device and supplied with power from the intermittently driven inverter circuit to supply power to the oscillation circuit are provided in the electric device. Accordingly, there is a problem in that space and cost are required to provide two secondary coils in the electric appliance.

SUMMARY OF THE INVENTION

In view of the above, the present invention provides a non-contact power supply system capable of reducing power consumption of a power supply device in a standby mode while curtailing the number of coils of a load device to which the power is supplied from the power supply device compared to a conventional case.

In accordance with an embodiment of the present invention, there is provided a non-contact power supply system. The non-contact power supply system includes a power supply device for transmitting high frequency power; and a load device which contactlessly receives the high frequency power transmitted from the power supply device by electromagnetic induction to supply the high frequency power to a load, wherein the power supply device includes a power transmission unit having a primary power coil for power transmission and an inverter circuit for supplying high frequency current to the primary power coil; an inquiry unit having a primary signal coil for receiving a signal from the load device and an oscillation circuit, the primary signal coil being connected between output terminals of the oscillation circuit; a signal detection unit for detecting the signal received by the primary signal coil; and a control unit for controlling the power transmission unit according to the signal detected by the signal detection unit, wherein the load device includes the load; a power reception unit having a secondary power coil for power reception which is magnetically coupled to the primary power coil and a power conversion unit which converts the high frequency power, induced in the secondary power coil into power for the load; a secondary signal coil which is magnetically coupled to the primary signal coil; and a response unit which is operated by an electromotive force induced in the secondary signal coil to transmit the signal from the secondary signal coil, and wherein the control unit of the power supply device does not execute the power transmission from the power transmission unit when the signal detection unit does not detect the signal and executes the power transmission from the power transmission unit when the signal detection unit detects the signal.

In accordance with the embodiment of the present invention, the control unit of the power supply device stops power transmission of the power transmission unit when the signal detection unit detects no signal, and executes power transmission of the power transmission unit when the signal detection unit detects a signal. Accordingly, the power transmission unit of the power supply device can be completely stopped when the power is not supplied from the power supply device to the load device, thereby reducing power consumption of the power supply device in a standby mode. Further, the response unit of the load device is operated by the induced electromotive force generated in the secondary signal coil magnetically coupled to the primary signal coil to transmit a signal from the secondary signal coil.

Therefore, it is unnecessary to provide another coil in addition to the secondary signal coil to supply operation power to the response unit from the power supply device. As a result, it is possible to reduce power consumption of the power supply device in a standby mode while curtailing the number of coils of the load device to which the power is supplied from the power supply device compared to a conventional case.

The primary power coil and the primary signal coil may be substantially coaxially arranged in the power supply device, and the secondary power coil and the secondary signal coil may be substantially coaxially arranged in the load device.

Therefore, the power supply device and the load device can be minimized. Further, when conductive foreign substrate other than the secondary signal coil is present within a range that a magnetic flux generated around the primary signal coil exists, the electromotive force is induced in the foreign substrate, so that the presence of the foreign substrate can be found. However, the primary power coil and the primary signal coil are substantially coaxially arranged, and the secondary power coil and the secondary signal coil are substantially coaxially arranged so that it can be found that the foreign substrate provided between the primary power coil and the secondary power coil is present. Accordingly, it is possible to prevent the foreign substrate from being heated.

The control unit of the power supply device may drive the inverter circuit intermittently, when it executes the power transmission from the power transmission unit and stop the power transmission from the power transmission unit if the signal detection unit does not detect the signal during a pause period of the inverter circuit.

As a result, while the inverter circuit is driven, the primary signal coil is situated in a magnetic flux generated around the primary power coil. Accordingly, a noise component is added to the signal received to the primary signal coil. Therefore, the control unit of the power supply device drives the inverter circuit intermittently, when it executes the power transmission from the power transmission unit and stops the power transmission from the power transmission unit if the signal detection unit does not detect the signal during a pause period of the inverter circuit. Consequently, detection accuracy of the signal detection unit is improved so that malfunction of the power transmission unit can be prevented.

The signal may be an amplitude modulated signal and the signal detection unit of the power supply device may detect an envelope of voltage induced in the primary signal coil and determine that the signal is detected if a detected voltage level exceeds a threshold value.

Consequently, it is possible to obtain the same effects as the case that the control unit of the power supply device, when it executes power transmission of the power transmission unit, allows the inverter circuit to be intermittently driven and stops power transmission of the power transmission unit if the signal detection unit detects no signal during a pause period of the inverter circuit.

The load device may include a load device control unit for transmitting a control command from the response unit to the control unit of the power supply device to instruct stop of the power transmission from the power transmission unit or reduction of transmission power.

Conventionally, if the load is A secondary battery for example and if the power is continuously supplied from the power transmission unit even after the secondary battery is fully charged, the power is wasted. In accordance with the embodiment of the present invention, however, a load device control unit transmits control command from the response unit to instruct stop of power transmission from the power transmission unit of the power supply device, thereby suppressing waste of the power.

The control unit of the power supply device may not execute the power transmission from the power transmission unit if a signal level detected by the signal detection unit is constant.

Hence, when conductive foreign substrate other than the load device is present within a range that a magnetic flux generated around the primary signal coil exists, the electromotive force is induced in the foreign substrate so that a level of the signal detected in the signal detection unit decreases. Accordingly, the control unit of the power supply device does, not execute power transmission of the power transmission unit if the level of the signal detected by the signal detection unit is smaller than a predetermined determination value.

The response unit of the load device may have a power circuit which produces operation power from a voltage induced in the secondary signal coil and a modulation circuit which is operated by the operation power produced by the power circuit to output a modulation signal to the secondary signal coil.

The modulation circuit may produce the signal modulated by varying an impedance of an impedance element connected between the two ends of the secondary signal coil.

Consequently, the modulation circuit can be implemented to have a simple configuration.

The power reception unit of the load device may further have a power circuit for producing operation power of the response unit from the high frequency power induced in the secondary power coil.

Resultantly, the second power circuit produces the operation power of the response unit by using the high frequency power received by the power reception unit, thus there is an advantage of improving the detection accuracy of the signal detection unit by increasing the power transmitted from the response unit.

The signal detection unit of the power supply device may further have one or more additional primary signal coils.

As a result, it is possible to prevent the foreign substrate smaller than the primary power coil from being heated.

Further, the non-contact power supply system may further include additional one or more load devices, and the load device and the additional load devices may have different types of loads and response units of the load device and the additional load devices may transmit and receive signals of different frequencies according to the types of the loads, and the inquiry unit of the power supply device may allow the oscillation circuit to oscillate at frequencies varying according to the types of the load device and the additional load devices.

As a consequence, one power supply device can correspond to plural different types of loads.

The load device may further include an additional power circuit for producing operation power of the response unit from high frequency power induced in the secondary power coil and a load device signal transmission unit operated by the power produced by the additional power circuit to transmit a transmission signal, and the power supply device may include a power supply device signal reception unit for receiving the transmission signal from the load device signal transmission unit.

Therefore, various information data can be transferred between the load device signal transmission unit and the power supply device side signal reception unit.

The power supply device may further include a modulation circuit for modulating the high frequency power from the power transmission unit by an information signal and the load device may further include a demodulation circuit for demodulating high frequency power induced in the secondary power coil to recover the information signal.

Accordingly, various information data can be transferred from the power supply device to the load device.

The oscillation circuit may oscillate intermittently while the signal detection unit does not detect the signal and the oscillation circuit may continuously oscillate if the signal detection unit detects the signal.

Hence, it is possible to further reduce power consumption in a standby mode by intermittently oscillating the oscillation circuit of the inquiry unit.

Further, an inner and an outer diameter of the primary signal coil may be substantially identical to those of the secondary signal coil and the inner diameter of the secondary signal coil may be larger than an outer diameter of the secondary power coil.

Consequently, the secondary signal coil is arranged outwardly from the secondary power coil 111, thus it is possible to reduce an influence of the secondary power coil when a signal is transmitted from the secondary signal coil.

The primary signal coil and the secondary signal coil may be arranged between the primary power coil and the secondary power coil while the primary power coil and the secondary power coil are magnetically coupled to each other.

As a result, detection accuracy of the signal detection unit can be improved by reducing a distance between the primary signal coil and the secondary signal coil.

The oscillation circuit of the inquiry unit may oscillate at a frequency higher than that of the inverter circuit, and the response unit may have a power circuit which produces operation power from a voltage induced in the secondary signal coil and a modulation circuit which is operated by the operation power produced by the power circuit to output a modulation signal of a frequency lower than that of the inverter circuit to the secondary signal coil.

Therefore, when the signal detection unit detects the signal, it is easy to discriminate the oscillation frequency of the oscillation circuit and the frequency of the inverter circuit. Further, by increasing the oscillation frequency of the oscillation circuit to a relatively highest level, it is possible to suppress waste of power of the oscillation circuit.

The load device may include a response signal transmission unit which is operated by the high frequency power induced in the secondary power coil to transmit a response signal through the secondary power coil. The power supply device may include a response signal reception unit for receiving the response signal through the primary power coil magnetically coupled to the secondary power coil, and when the control unit of the power supply device executes the power transmission from the power transmission unit according to the signal detected by the signal detection unit, the control unit stops the power transmission from the power transmission unit if a period in which the response signal reception unit receives no response signal exceeds a specific period and the control unit continues the power transmission from the power transmission unit if the period in which the response signal reception unit receives no response signal does not exceed the specific period.

As a consequence, while the inverter circuit is driven, the primary signal is situated in the magnetic field generated around the primary power coil so that a noise component is added to the signal received at the primary signal coil. Accordingly, the detection accuracy of the signal detection unit is reduced, the transmission of the power transmission unit may be stopped, when the load is dislocated, power loss may be increased or the foreign substrate may be heated.

However, when the signal is detected by the signal detection unit and the control unit starts power transmission from the power transmission unit, the power transmission of the power transmission unit is continued while the response signal reception unit receives the response signal transmitted from the response signal transmission unit of the load device and is stopped when the response signal is not received. Hence, even though the detection accuracy of the signal detection unit is reduced, it is possible to prevent malfunction of the power transmission unit. Further, the inverter circuit of the power transmission unit can be continuously driven thus power supply efficiency is improved compared to the case in which the inverter circuit is intermittently driven as described above.

The load device may include a load device control unit for transmitting a control command from the response unit and the response signal transmission unit to the control unit of the power supply device to instruct stop of the power transmission from the power transmission unit or reduction of transmission power.

Conventionally, for example, when the load is a secondary battery, if the power is continuously supplied from the power transmission unit even after the secondary battery is fully charged, the power is wasted. In accordance with the embodiment of the present invention, therefore, a load device control unit transmits control command from the response unit and the response signal transmission unit to instruct stop of power transmission from the power transmission unit of the power supply device, thereby suppressing waste of the power. Further, since the control command is transmitted from the response signal transmission unit as well as the response unit, reliability of the signal transmission is enhanced and the power transmission unit is securely controlled.

In accordance with the embodiment of the present invention, it is possible to reduce power consumption of a power supply device in a standby mode while curtailing the number of coils of a load device to which the power is supplied from the power supply device compared to a conventional case.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

First Embodiment

Figure 1:
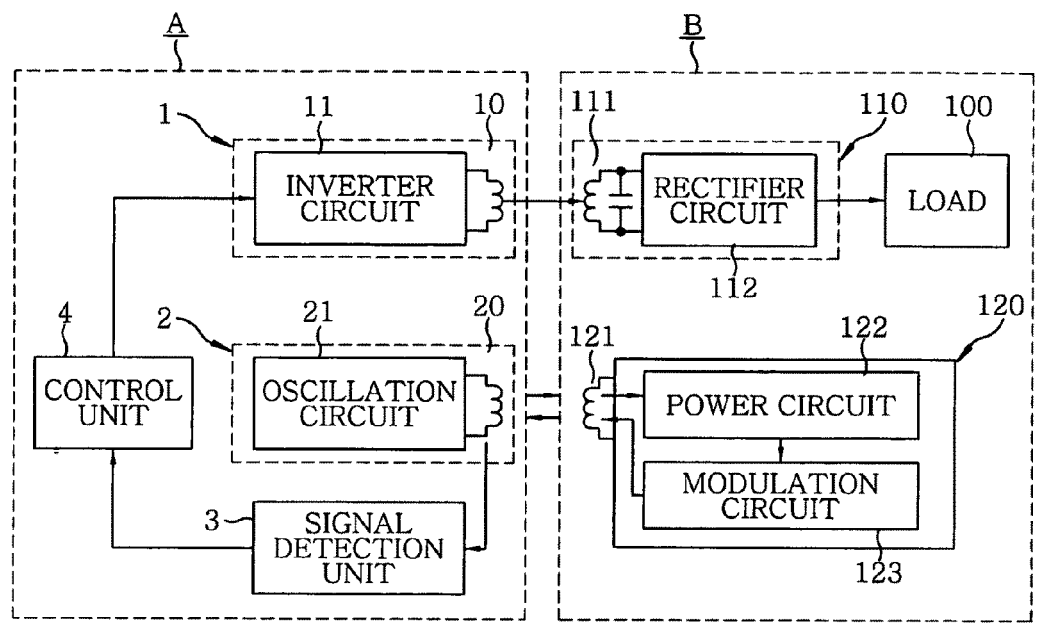
FIG. 1 illustrates a block diagram of a power supply device and a load device in accordance with a first embodiment of the present invention.

A non-contact power supply system in accordance with a first embodiment of the present invention includes, as shown in FIG. 1, a power supply device A which transmits high frequency power and a load device B which receives the high frequency power transmitted from the power supply device A in a non-contact mode by electromagnetic induction to supply the power to a load.

The power supply device A includes a power transmission unit 1 having a primary power coil 10 for power transmission and an inverter circuit 11 for supplying high frequency current to the primary power coil 10, and an inquiry unit 2 having a primary signal coil 20 for transmitting/receiving a signal to/from the load device B and an oscillation circuit 21, the primary signal coil 20 being connected between output terminals of the oscillation circuit 21. The power supply device A further includes a signal detection unit 3 for detecting the signal received by the primary signal coil 20, and a control unit 4 for controlling the power transmission unit 1 according to the signal detected by the signal detection unit 3.

The inverter circuit 11 converts alternate current (AC) of a low frequency (50 Hz or 60 Hz) supplied from a commercial AC power source (not shown) into current of high frequency (about 100 kHz) (high frequency current) to supply the high frequency current to the primary power coil 10. Since the inverter circuit 11 is well known in the art, detailed configuration, illustration and description thereof will be omitted.

The oscillation circuit 21 generates an oscillation signal at a frequency (e.g., 4 MHz) sufficiently higher than the frequency of the inverter circuit 11 to supply the oscillation signal (e.g., sinusoidal signal) to the primary signal coil 20. Since the oscillation circuit 21 is well known in the art, detailed configuration, illustration and description thereof will be omitted.

The control unit 4 includes a microcomputer as a main component. The control unit 4 performs various processes including the control of an operation of the inverter circuit 11 by executing programs stored in a memory (not shown) in the microcomputer.

The load device B includes a load (e.g., secondary battery) 100, and a power reception unit 110 having a secondary power coil 111 for power reception which is magnetically coupled to the primary power coil 10 and a power conversion unit (rectifier circuit 112 in this embodiment) which converts the high frequency power induced in the secondary power coil 111 into power suitable for the load 100. The load device B further includes a secondary signal coil 121 which is magnetically coupled to the primary signal coil 20 and a response unit 120 which is operated by an electromotive force induced in the secondary signal coil 121 to transmit a signal from the secondary signal coil 121.

In the power reception unit 110, the high frequency power induced in the secondary power coil 111 is rectified by the rectifier circuit 112 to charge the secondary battery serving as the load 100.

The response unit 120 has a power circuit 122 which produces operation power (direct current (DC) voltage) from the induced electromotive force generated in the secondary signal coil 121 and a modulation circuit 123 which is operated by the operation power produced by the power circuit 122 to output a modulation signal to the secondary signal coil 121. Further, in this embodiment, a resonance capacitor C2 is connected between both ends of the secondary signal coil 121 as shown in FIG. 2, and the secondary signal coil 121 and the capacitor C2 form a resonance circuit to increase high frequency voltage that is applied to the power circuit 122 or the modulation circuit 123.

Figure 2:
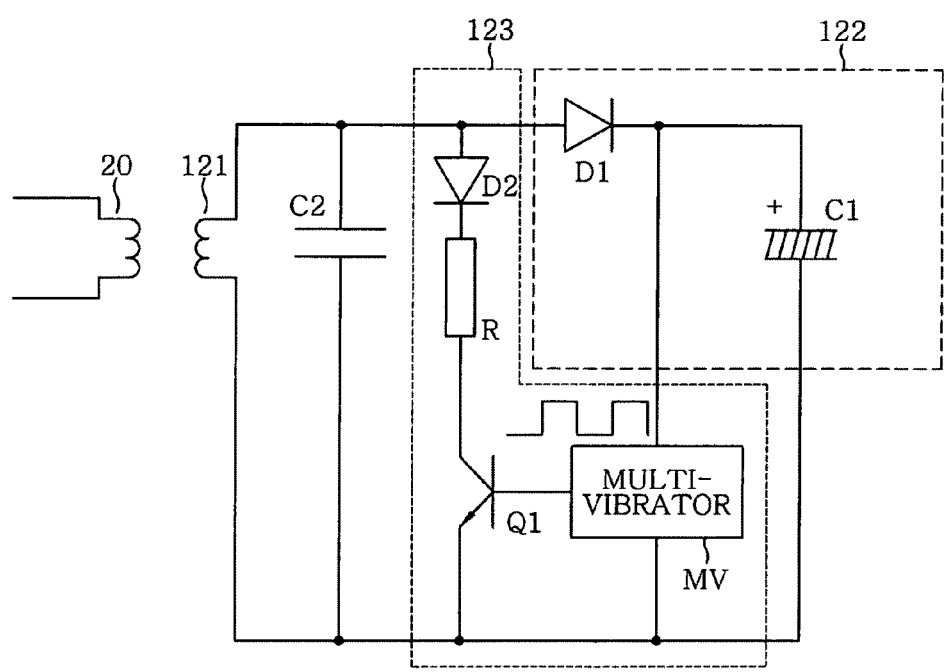
FIG. 2 is a specific circuit diagram of a response unit in accordance with the first embodiment of the present invention.

In the power circuit 122 as shown in FIG. 2, high frequency current flowing in the secondary signal coil 121 is rectified by a diode D1 to charge an electrolytic capacitor C1. The electric charges of the electrolytic capacitor C1 are discharged to supply DC voltage to the modulation circuit 123.

The modulation circuit 123 includes, as shown in FIG. 2, a series circuit of a rectifying diode D2, a resistor R and a switching element Q1 formed of a bipolar transistor, and a multi-vibrator MV for generating a square wave signal (modulated signal) of a low frequency (about 1 kHz). The modulation circuit 123 modulates an amplitude of the high frequency voltage (carrier wave) induced in the secondary signal coil 121 with the square wave signal outputted from the multi-vibrator MV by switching the switching element Q1 with the square wave signal. In this case, a capacitor or a parallel circuit of capacitors may be provided instead of the resistor R to increase or decrease an impedance (electrostatic capacitance) connected to the secondary signal coil 121 according to on and off of the switching element Q1.

Meanwhile, when the carrier wave (high frequency voltage induced in the secondary signal coil 121) is amplitude-modulated by the modulation circuit 123, a high frequency voltage waveform of the primary signal coil 20 magnetically coupled to the secondary signal coil 121 is also changed. Accordingly, the signal detection unit 3 demodulates (detects) the modulated signal (square wave signal) by detecting an envelope of the high frequency voltage waveform of the primary signal coil 20.

Figure 3A:
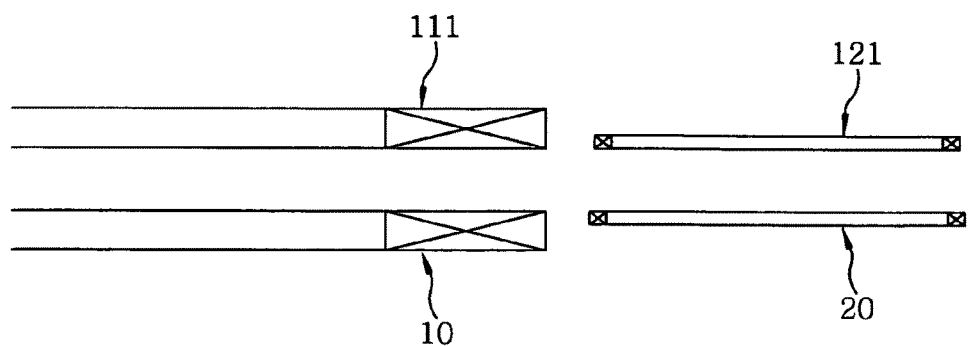
FIG. 3A illustrates a cross sectional view of a primary power coil, a secondary power coil, a primary signal coil and a secondary signal coil in accordance with the first embodiment of the present invention.
Figure 3B:
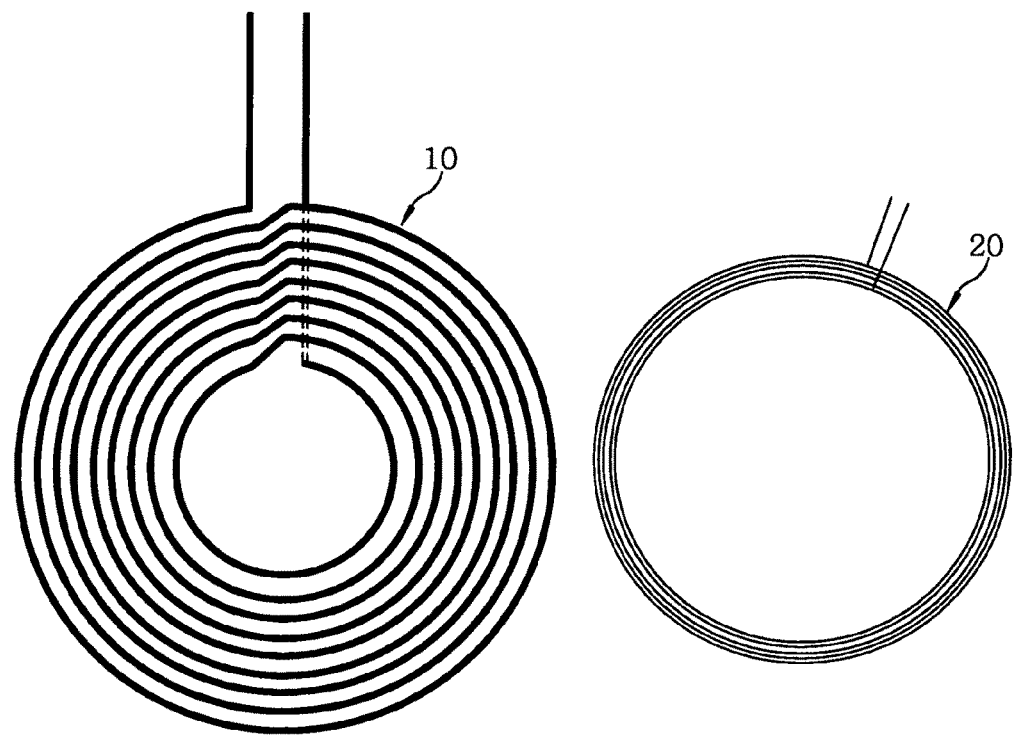
FIG. 3B illustrates a plan view of the primary power coil and the primary signal coil.

In the power supply device A and the load device B, as shown in FIGS. 3A and 3B, each of the set of primary coils 10 and 20 and the set of secondary coils 111 and 121 n is arranged in a plane substantially perpendicular to an axial direction thereof (vertical direction in FIG. 3A).

Figure 4:
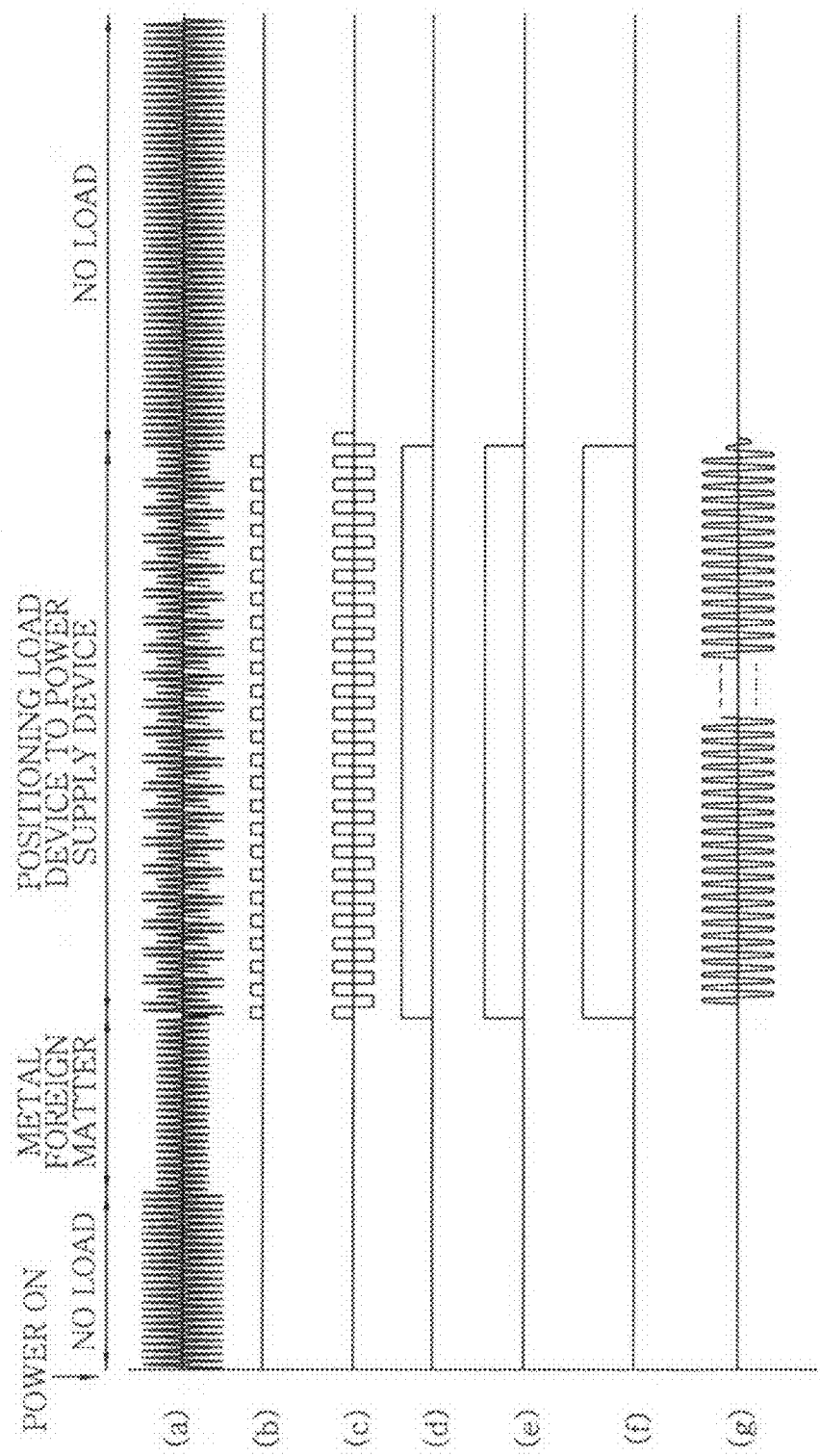
FIG. 4 shows a waveform diagram for explaining an operation of the first embodiment of the present invention.

Next, an operation of the embodiment of the present invention will be described with reference to a waveform diagram of FIG. 4. In FIG. 4, (a) illustrates a waveform of the high frequency voltage generated in the primary signal coil 20, (b) shows the modulated signal (square wave signal) outputted from the modulation circuit 123, (c) depicts a detection waveform obtained when the signal detection unit 3 detects an envelope of the high frequency voltage waveform of the primary signal coil 20, (d) sets forth a waveform obtained by peak-holding the detection waveform, (e) represents a signal detection result obtained by the signal detection unit 3 (binary signal having a level H when a signal is detected from the load device B and a level L when a signal is not detected from the load device B), (f) illustrates a control signal of the control unit 4 for controlling the power transmission unit 1 (signal for driving the inverter circuit 11 at a level H and stopping the inverter circuit 11 at a level L), and (g) shows a waveform of the high frequency current flowing in the primary power coil 10.

When electric power begins to be supplied to the power supply device A from the commercial AC power source (not shown) (power ON), the control unit 4 outputs a control signal of the level L to stop the inverter circuit 11 of the power transmission unit 1, and the oscillation circuit 21 of the inquiry unit 2 immediately begins to oscillate. In a no-load state wherein the secondary signal coil 121 of the load device B is absent in the vicinity of the primary signal coil 20, the amplitude of the waveform of the high frequency voltage generated in the primary signal coil 20 is constant. When the amplitude of the high frequency voltage waveform is constant, the signal detection unit 3 does not perform envelope detection and outputs a detection result of 'No signal' (signal of the level L) to the control unit 4. Since the signal detection unit 3 detects no signal, the control unit 4 determines that it is in the no-load state and continuously outputs a control signal of the level L such that the inverter circuit 11 of the power transmission unit 1 is maintained in a stopped state.

Further, when an electrically conductive foreign substrate (e.g., metal) is present in the vicinity of the primary signal coil 20, to be situated in a magnetic field generated around the primary signal coil 20, the amplitude of the high frequency voltage waveform is reduced, but constant. Since the amplitude of the high frequency voltage waveform is not changed, the signal detection unit 3 does not perform envelope detection, and outputs a detection result of 'No signal' to the control unit 4. Since the signal detection unit 3 does not detect a signal, the control unit 4 continuously outputs a control signal of the level L, so that the inverter circuit 11 of the power transmission unit 1 is maintained in the stopped state.

Meanwhile, when the load device B is arranged at prescribed position with respect to the power supply device A, the primary power coil 10 and the primary signal coil 20 are positioned to be magnetically coupled to the secondary power coil 111 and the secondary signal coil 121, respectively. When the secondary signal coil 121 is magnetically coupled to the primary signal coil 20, an induced electromotive force is generated in the secondary signal coil 121 and the power circuit 122 produces operation power. The modulation circuit 123 begins to be operated by the operation power produced in the power circuit 122 to output a modulation signal to the secondary signal coil 121 (see (b) of FIG. 4).

Consequently, the carrier wave is amplitude modulated by the modulation circuit 123 (see (a) of FIG. 4), and the high frequency voltage waveform of the primary signal coil 20 magnetically coupled to the secondary signal coil 121 is also changed. The signal detection unit 3 demodulates (detects) the modulated signal (square wave signal) by detecting an envelope of the high frequency voltage waveform of the primary signal coil 20 (see (c) of FIG. 4). The signal detection unit 3 performs a peak hold operation on the demodulated square wave signal (see (d) of FIG. 4).

If a peak value exceeds a predetermined threshold value, the signal detection unit 3 determines that the load device B is present and outputs a detection result of 'Signal present' (signal of the level H) to the control unit (see (e) of FIG. 4). When the control unit 4 receives the signal of the level H from the signal detection unit 3, the control unit 4 converts a control signal of the level L into a control signal of the level H to drive the inverter circuit 11 of the power transmission unit 1 (see (f) of FIG. 4). When the inverter circuit 11 is driven, high frequency power is transmitted to the power reception unit 110 from the power transmission unit 1 in a non-contact mode to charge the secondary battery serving as the load 100.

Further, when the load device B is transferred from the prescribed position A such that the primary power coil 10 and the primary signal coil 20 cannot be magnetically coupled to the secondary power coil 111 and the secondary signal coil 121, respectively, the aforementioned no-load state is established. Then the signal detection unit 3 outputs the detection result of 'No signal' (signal of the level L) to the control unit 4. The control unit 4 converts the control signal of the level H into the control signal of the level L to stop the inverter circuit 11.

As described above, in this embodiment, the control unit 4 of the power supply device A stops power transmission from the power transmission unit 1 when the signal detection unit 3 detects no signal, and executes power transmission from the power transmission unit 1 when the signal detection unit 3 detects a signal. Accordingly, the power transmission unit 1 (inverter circuit 11) of the power supply device A can be completely stopped when the power is not supplied from the power supply device A to the load device B, thereby reducing power consumption of the power supply device A in a standby mode.

Further, the response unit 120 of the load device B is operated by the induced electromotive force generated in the secondary signal coil 121 magnetically coupled to the primary signal coil 20 to transmit a signal from the secondary signal coil 121. Accordingly, it is unnecessary to provide another coil in addition to the secondary signal coil 121 to supply operation power to the response unit 120 from the power supply device A. As a result, it is possible to reduce power consumption of the power supply device A in the standby mode while reducing the number of coils of the load device B to which the power is supplied from the power supply device A compared to a conventional case.

However, when the primary signal coil 20 and the secondary signal coil 121 are respectively disposed apart from the primary power coil 10 and the secondary power coil 111 in the planes perpendicular to an axial direction as shown in FIGS. 3A and 3B, a foreign substrate (e.g., metal piece) may be disposed between the primary power coil 10 and the secondary power coil 111 in a state wherein the load device B is arranged at the prescribed position with respect to the power supply device A. In this case, the control unit 4 may drive the inverter circuit 11 to heat the foreign substrate. Accordingly, it is preferable to detect the foreign substrate (e.g., metal piece) disposed between the primary power coil 10 and the secondary power coil 111 and render the control unit 4 to stop the inverter circuit 11 to prevent the foreign substrate from being heated in such a case.

Figure 5:
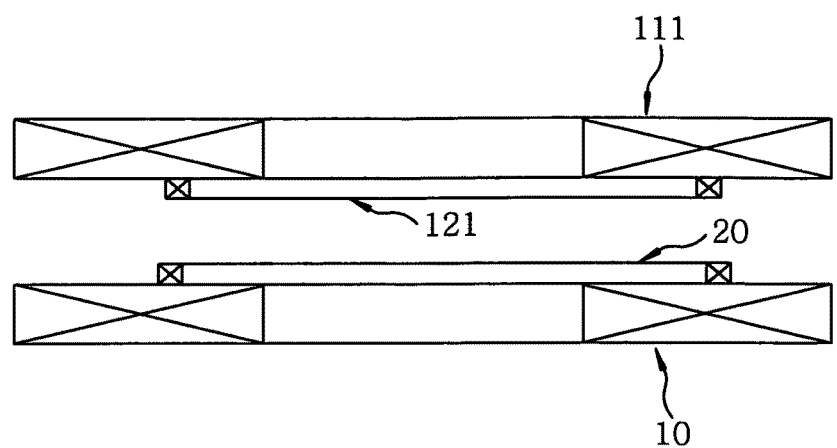
FIG. 5 is a cross sectional view showing another configuration of the primary power coil, the secondary power coil, the primary signal coil and the secondary signal coil in accordance with the first embodiment of the present invention.
Figure 6A:
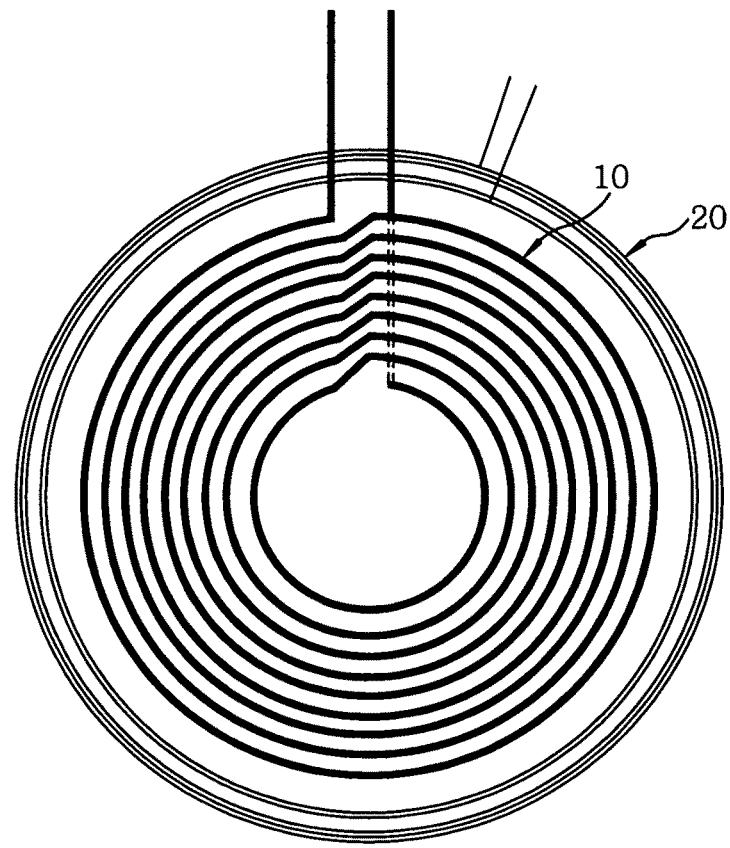
FIG. 6A is, a plan view showing another configuration of the primary power coil and the primary signal coil
Figure 6B:
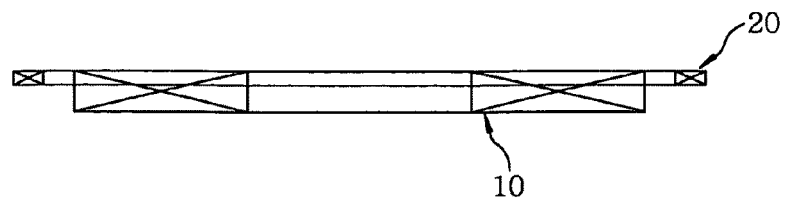
FIG. 6B is a cross sectional view showing another configuration of the primary power coil and the primary signal coil in accordance with the first embodiment of the present invention.
Figure 7:
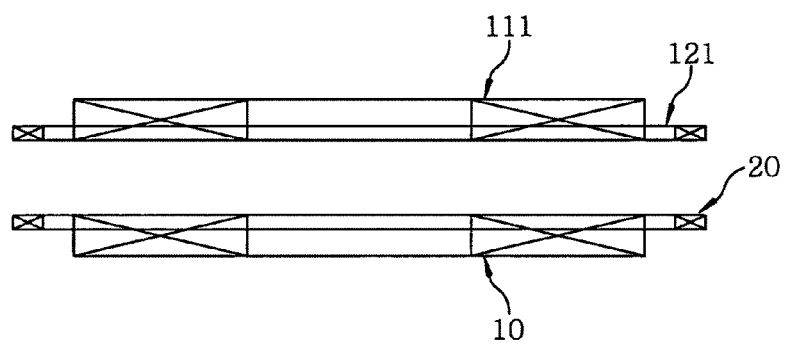
FIG. 7 is a cross sectional view showing still another configuration of the primary power coil, the secondary power coil, the primary signal coil and the secondary signal coil in accordance with the first embodiment of the present invention.
Figure 8:
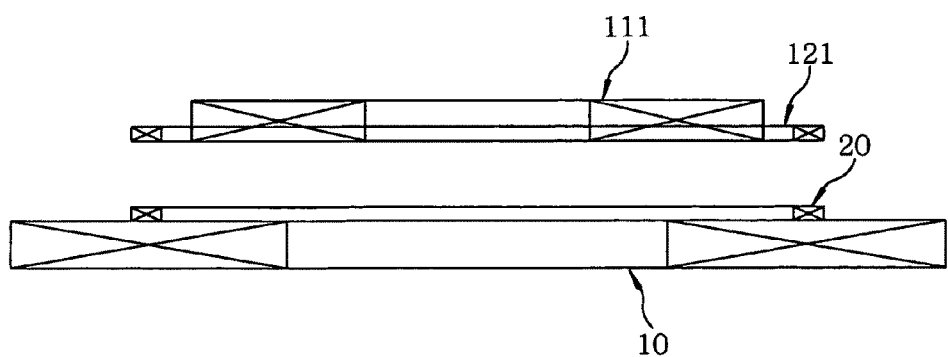
FIG. 8 is a cross sectional view showing still another configuration of the primary power coil, the secondary power coil, the primary signal coil and the secondary signal coil in accordance with the first embodiment of the present invention.

In this respect, the primary power coil 10 and the primary signal coil 20 may be preferably coaxially arranged in the power supply device A, and the secondary power coil 111 and the secondary signal coil 121 may be also preferably coaxially arranged in the load device B (see FIG. 5). In the example shown in FIG. 5, the primary power coil 10 and the primary signal coil 20 are formed in a circular shape having the substantially same size, i.e., the same inner and outer diameters, as the secondary power coil 111 and the secondary signal coil 121, respectively.

Further, as shown in FIG. 5, the respective coils are arranged in the power supply device A and the load device B such that the primary signal coil 20 and the secondary signal coil 121 are arranged between the primary power coil 10 and the secondary power coil 111 while the primary power coil 10 and the secondary power coil 111 are substantially coaxially arranged to face each other in a magnetically coupled state.

This arrangement provides an advantage of improving detection accuracy of the signal detection unit 3 by reducing a distance between the primary signal coil 20 and the secondary signal coil 121. Further, it is preferable that the secondary signal coil 121 is influenced as little as possible by another coil (especially, the secondary power coil 111) to allow the carrier wave to be highly modulated. Accordingly, the secondary signal coil 121 is arranged outwardly from the secondary power coil 111 as shown in FIGS. 6A to 8, thereby reducing an influence of the secondary power coil 111 when a signal is transmitted from the secondary signal coil 121 (when the carrier wave is modulated). That is, the secondary coils 111 and 112 are disposed on a same plane and the inner and the outer diameter of the secondary signal coil 121 are greater than the outer diameter of the secondary power coil 111. Further, although a circular arc-shaped coil wound in a plane is used in this embodiment, it is not limited thereto and a cylindrical, rectangular or elliptical coil may be used.

Figure 9:
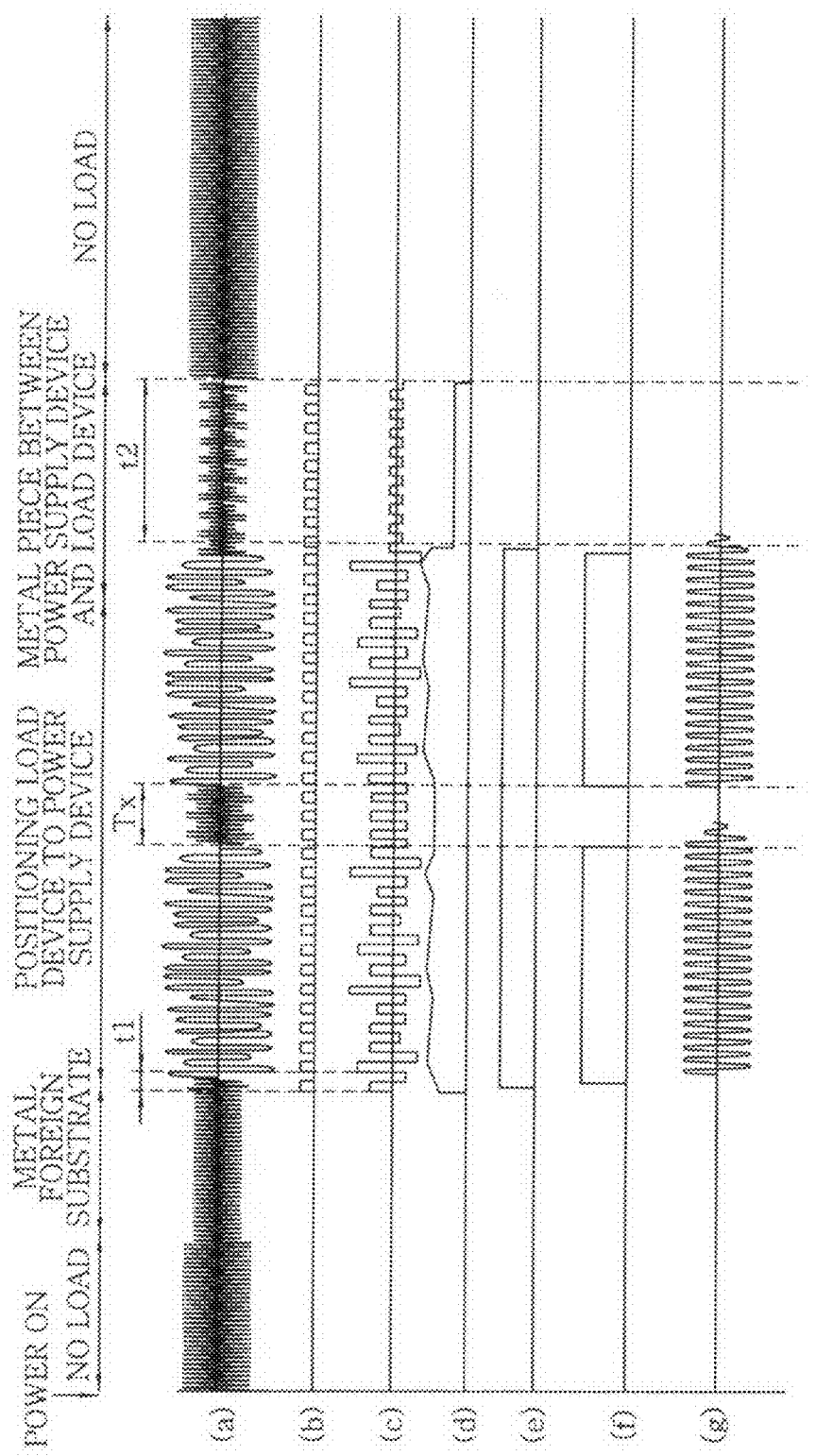
FIG. 9 shows a waveform diagram for explaining an operation of the first embodiment of the present invention.

Next, another operation of this embodiment will be described with reference to a waveform diagram of FIG. 9. In FIG. 9, (a) illustrates a waveform of the high frequency voltage generated in the primary signal coil 20, (b) shows a modulated signal (square wave signal) outputted from the modulation circuit 123, (c) depicts a detection waveform obtained when the signal detection unit 3 detects an envelope of the high frequency voltage waveform of the primary signal coil 20, (d) sets forth a waveform obtained by peak-holding the detection waveform, (e) represents a signal detection result obtained by the signal detection unit 3 (binary signal having a level H when a signal is detected from the load device B and a level L when a signal is not detected from the load device B), (f) illustrates a control signal of the control unit 4 for controlling the power transmission unit 1 (signal for driving the inverter circuit 11 at a level H and stopping the inverter circuit 11 at a level L), and (g) shows a waveform of high frequency current flowing in the primary power coil 10.

In this case, the operation in the no-load state and when only a metal foreign substrate is present in the vicinity of the primary signal coil 20 is the same as the above-described case and, thus, description thereof is omitted.

When the load device B is arranged at the prescribed position with respect to the power supply device A, the primary power coil 10 and the primary signal coil 20 are positioned to be magnetically coupled to the secondary power coil 111 and the secondary signal coil 121, respectively. When the secondary signal coil 121 is magnetically coupled to the primary signal coil 20, an induced electromotive force is generated in the secondary signal coil 121 and the power circuit 122 produces operation power. The modulation circuit 123 begins to be operated by the operation power produced in the power circuit 122 to output a modulation signal to the secondary signal coil 121 (see (b) of FIG. 9).

Consequently, the carrier wave is amplitude modulated by the modulation circuit 123 (see a time period t1 in (a) of FIG. 9), and the high frequency voltage waveform of the primary signal coil 20 magnetically coupled to the secondary signal coil 121 is also changed. The signal detection unit demodulates (detects) the modulated signal (square wave signal) by detecting an envelope of the high frequency voltage waveform of the primary signal coil 20 (see (c) of FIG. 9). The signal detection unit 3 performs a peak-hold operation on the demodulated square wave signal (see (d) of FIG. 9). If a peak value exceeds a predetermined threshold value, the signal detection unit 3 determines that the load device B is present and outputs a detection result of 'Signal present' (signal of level H) to the control unit 4 (see (e) of FIG. 9). When the control unit 4 receives the signal of the level H from the signal detection unit 3, the control unit 4 converts a control signal of the level L into a control signal of the level H to drive the inverter circuit 11 of the power transmission unit 1 (see (f) of FIG. 9). When the inverter circuit 11 is driven, high frequency power is transmitted to the power reception unit 110 from the power transmission unit 1 in a non-contact mode to charge the secondary battery serving as the load 100.

In this case, while the inverter circuit 11 is driven, a magnetic flux generated around the primary power coil 10 affects the primary signal coil 20 substantially coaxially arranged with the primary power coil 10. Accordingly, as shown in (a) of FIG. 9, a large noise component is added to the high frequency voltage waveform generated in the primary signal coil 20. Thus, it is difficult to detect a signal in the signal detection unit 3.

Accordingly, in this embodiment, the control unit 4 drives the inverter circuit 11 intermittently. Only the detection result of the signal detection unit 3 obtained during a pause period Tx of the inverter circuit 11 is regarded as valid. If the signal detection unit 3 detects a signal during the pause period Tx, the inverter circuit 11 is intermittently driven, whereas if the signal detection unit 3 detects no signal during the pause period Tx, the inverter circuit 11 is stopped.

That is, since a magnetic flux is not generated around the primary power coil 10 during the pause period Tx of the inverter circuit 11, a large noise component is not added to the high frequency voltage waveform generated in the primary signal coil 20. Thus, the signal detection unit 3 can accurately detect a signal. Therefore, when the control unit 4 controls the power transmission unit 1 based on the detection result of the signal detection unit 3 obtained during the pause period Tx, malfunction can be prevented during the power transmission of the power transmission unit 1.

Meanwhile, when a foreign substrate (e.g., metal piece) is disposed between the primary coils 10 and 20 and the secondary coils 111 and 121, the high frequency voltage induced in the secondary signal coil 121 is reduced by the influence of the metal foreign substrate. As a result, for the reason that the power circuit 122 does not produce operation power sufficient for the operation of the modulation circuit 123 or the like, a voltage level of the high frequency voltage waveform generated in the primary signal coil 20 decreases, (see a time period t2 in (a) of FIG. 9).

Figure 10:
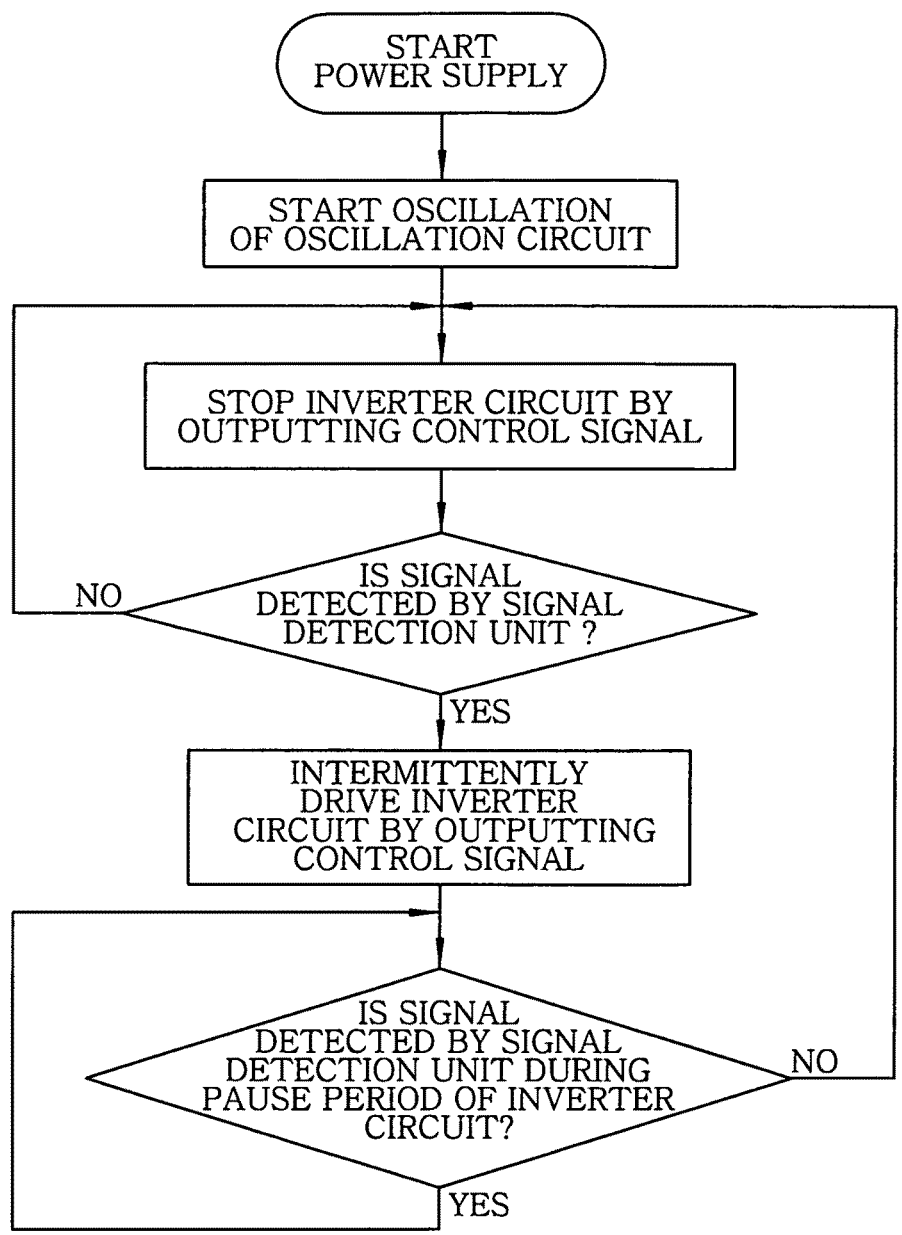
FIG. 10 is a flowchart showing an operation of the control unit of the power supply device in accordance with the first embodiment of the present invention.

Accordingly, the signal detection unit 3 outputs a detection result of 'No signal' (signal of the level L) to the control unit 4 because a peak value of the demodulated square wave signal does not exceeds the threshold value. Consequently, the control unit 4 coverts a control signal of the level H into a control signal of the level L to stop the inverter circuit 11, thereby preventing the metal foreign substrate from being heated by power transmission by the power transmission unit 1. FIG. 10 is a flow chart showing a process performed by the control unit 4 of the power supply device A in the above-described operation.

In this embodiment, the frequency (about 1 kHz) of the modulated signal of the modulation circuit 123 is relatively low compared to the oscillation frequency (about 4 MHz) of the oscillation circuit 21 and the frequency (about 100 kHz) of the inverter circuit 11. Accordingly, filtering can be easily performed when the signal detection unit 3 detects an envelope of the modulated signal. Further, both the primary signal coil 20 and the secondary signal coil 121 have a small diameter and a small winding number and are operated with low power consumption by increasing the oscillation frequency of the oscillation circuit 21 to a relatively highest level to increase the AC impedance of the coils 20 and 121 and reduce current flowing in the coils 20 and 121.

Further, in the power supply device A, the oscillation circuit 21 of the inquiry unit 2 continuously oscillates. Alternately, the oscillation circuit 21 may intermittently oscillate while the signal detection unit 3 detects no signal and may continuously oscillates while the signal detection unit 3 detects a signal. In this case, it is possible to further reduce power consumption in a standby mode compared to the case in which the oscillation circuit 21 continuously oscillates. Further, even in a case where the signal detection unit 3 detects a signal, the oscillation circuit 21 may oscillate only during the pause period Tx the intermittently driven inverter circuit 11 and the oscillation of the oscillation circuit 21 may be stopped during a period in which the inverter circuit 11 is being driven.

Figure 11:
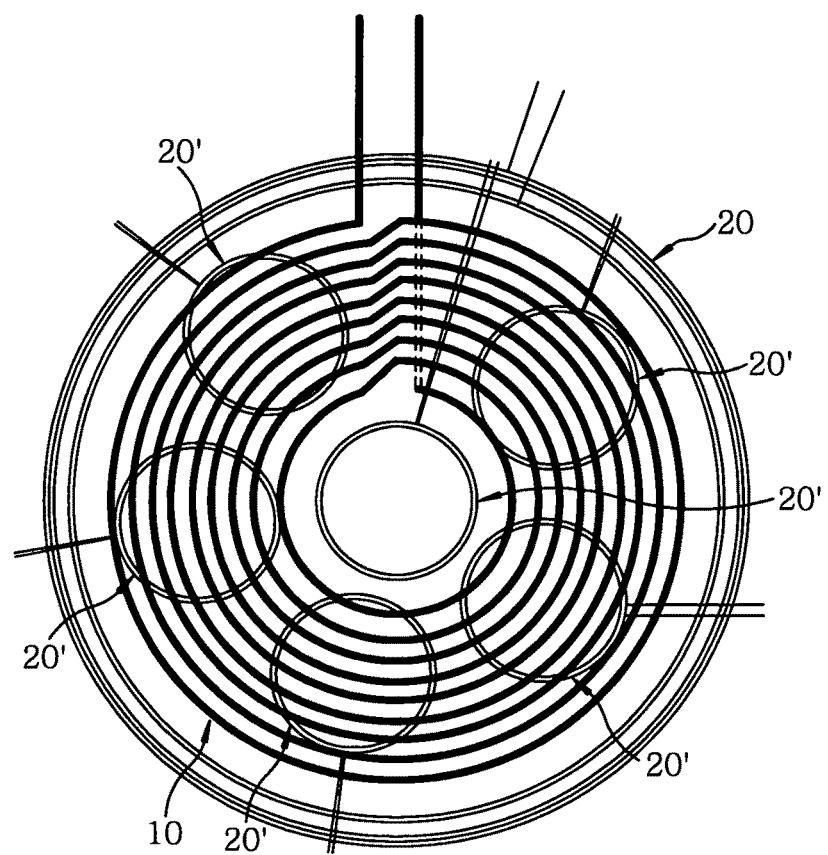
FIG. 11 is a plan view showing still another configuration of the primary power coil and primary signal coils in accordance with the first embodiment of the present invention.

Further, as illustrated in FIG. 11, in addition to the primary signal coil 20 larger than the primary power coil 10, plural (six in the illustrated example) primary signal coils 20' may be provided in the inquiry unit 2 of the power supply device A. By this configuration, even when a foreign substrate smaller than the primary power coil 10 is present, the presence of the foreign substrate can be detected based on the high frequency voltage waveform generated in one of the primary signal coils 20' and the inverter circuit 11 is stopped to prevent the foreign substrate from being heated.

However, when one power supply device A supplies power to plural load devices B having different types of loads 100, the power transmitted from the power transmission unit 1 is required to be controlled according the type of the load 100. Accordingly, the control unit 4 may drive the oscillation circuit 21 of the inquiry unit 2 to oscillate at predetermined multiple frequencies in a time division manner in a standby mode and determines the type of the load device B based on the signal detection results of the signal detection unit 3 at respective oscillation frequencies.

More specifically, the load devices B can be identified by the predetermined multiple frequencies set in the oscillation circuit 21 and the resonant frequency determined by the secondary coil 121 and the resonance capacitor C2 of each of the load devices B (see FIG. 2). The induced electromotive force is hardly generated in the secondary signal coil 121 at a non-resonant frequency so that the modulation circuit can not operate to output a modulation signal to the secondary signal coil 121. On the other hand, the induced electromotive force is generated in the secondary signal coil 121 at a resonant frequency and the modulation is performed. Consequently, the power supply device A can identify the load device B coupled thereto for power reception.

Then, the control unit 4 controls the power transmitted from the power transmission unit 1 by increasing or decreasing the frequency of the inverter circuit 11 according to the type of the load device B.

Second Embodiment

Figure 12:
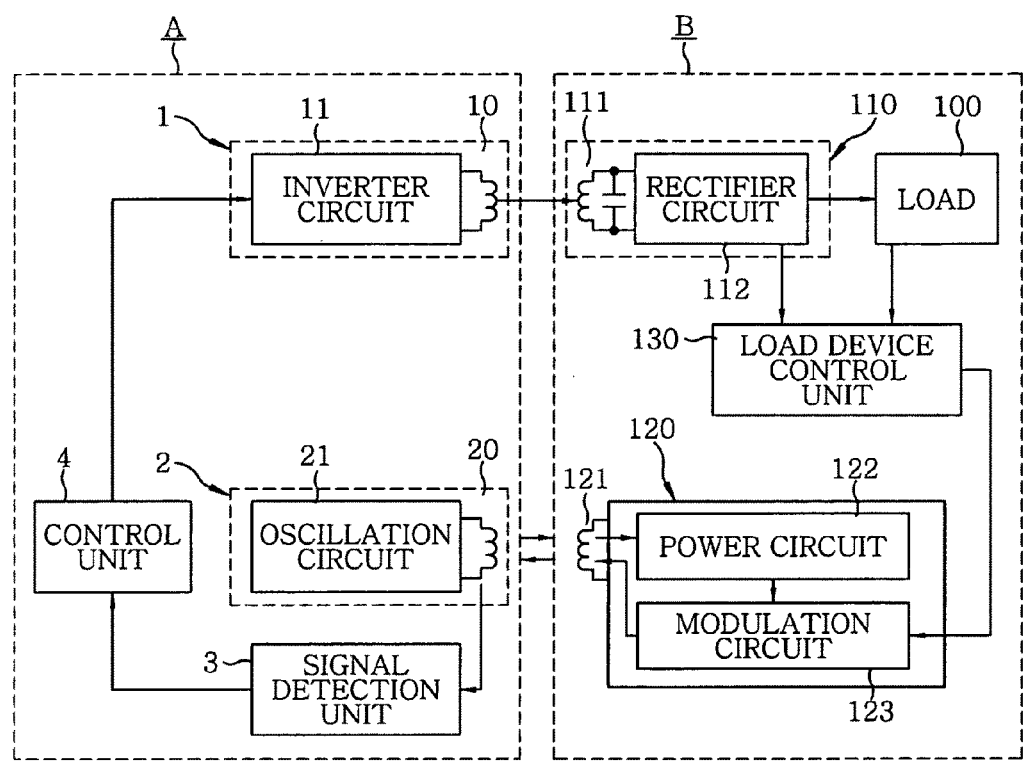
FIG. 12 illustrates a block diagram of a power supply device and a load device in accordance with a second embodiment of the present invention.

A non-contact power supply system in accordance with a second embodiment of the present invention, as shown in FIG. 12, has a feature that the load device B further includes a load device control unit 130 for transmitting a control command from the response unit 120 to the control unit 4 of the power supply device A to instruct stop of power transmission of the power transmission unit 1 or reduction of the transmission power level. Since other configurations are same as those of the first embodiment, the same components as those of the first embodiment will be assigned with the same reference numerals and explanation thereof will be omitted.

For example, if the load 100 is a secondary battery and the power is continuously supplied from the power supply device A even after the secondary battery is fully charged, the power is wasted. In such a case, it may be considered to provide a switch element (semiconductor switch element or relay) in a power supply path between the power reception unit 110 and the load 100 such that when the secondary battery is fully charged, the switch element is turned off to interrupt the power supply from the power reception unit 110 to the load 100. Since, however, the power is continuously supplied from the power transmission unit 1, a terminal voltage of the secondary power coil 111 is increased. Accordingly, a withstand voltage of the power conversion unit (rectifier circuit 112) is required to have a margin, thereby causing an increase in the cost and the size.

However, in this embodiment, when the secondary battery serving as the load 100 is fully charged, the load device control unit 130 stops the modulation circuit 123 of the response unit 120 such that the signal detection unit 3 of the power supply device A detects no signal. As a result, since the signal detection unit 3 detects no signal, the control unit 4 of the power supply device A stops the inverter circuit 11, thereby stopping the power supply of the power transmission unit 1.

Third Embodiment

Figure 13:
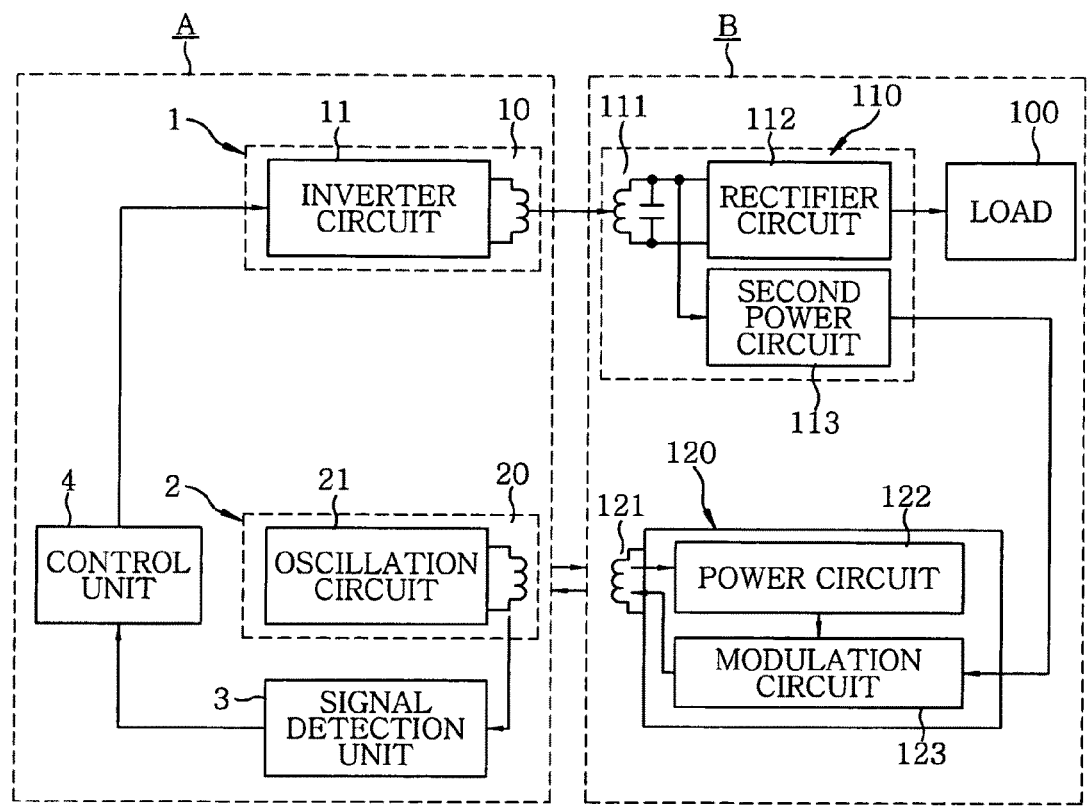
FIG. 13 illustrates a block diagram of a power supply device and a load device in accordance with a third embodiment of the present invention.

A non-contact power supply system in accordance with a third embodiment of the present invention, as shown in FIG. 13, has a feature that a second power circuit 113 for producing operation power of the response unit 120 from the high frequency power induced in the secondary power coil 111 is provided in the power reception unit 110 of the load device B. Further, since other configurations are same as those of the first embodiment, the same components as those of the first embodiment will be assigned with the same reference numerals and explanation thereof will be omitted.

The second power circuit 113 supplies DC power to the modulation circuit 123 of the response unit 120, the DC power being produced by rectifying and smoothing the high frequency power induced in the secondary power coil 111 when the power is supplied from the power transmission unit 1 to the power reception unit 110.

That is, the amount of the power transmitted from the inquiry unit 2 of the power supply device A is very small, and the amount of the operation power produced in the power circuit 122 of the response unit 120 is also very small. However, when the second power circuit 113 produces the operation power of the response unit 120 by using the high frequency power received by the power reception unit 110, there is an advantage of improving the detection accuracy of the signal detection unit 3 by increasing the power transmitted from the response unit 120.

Fourth Embodiment

Figure 14:
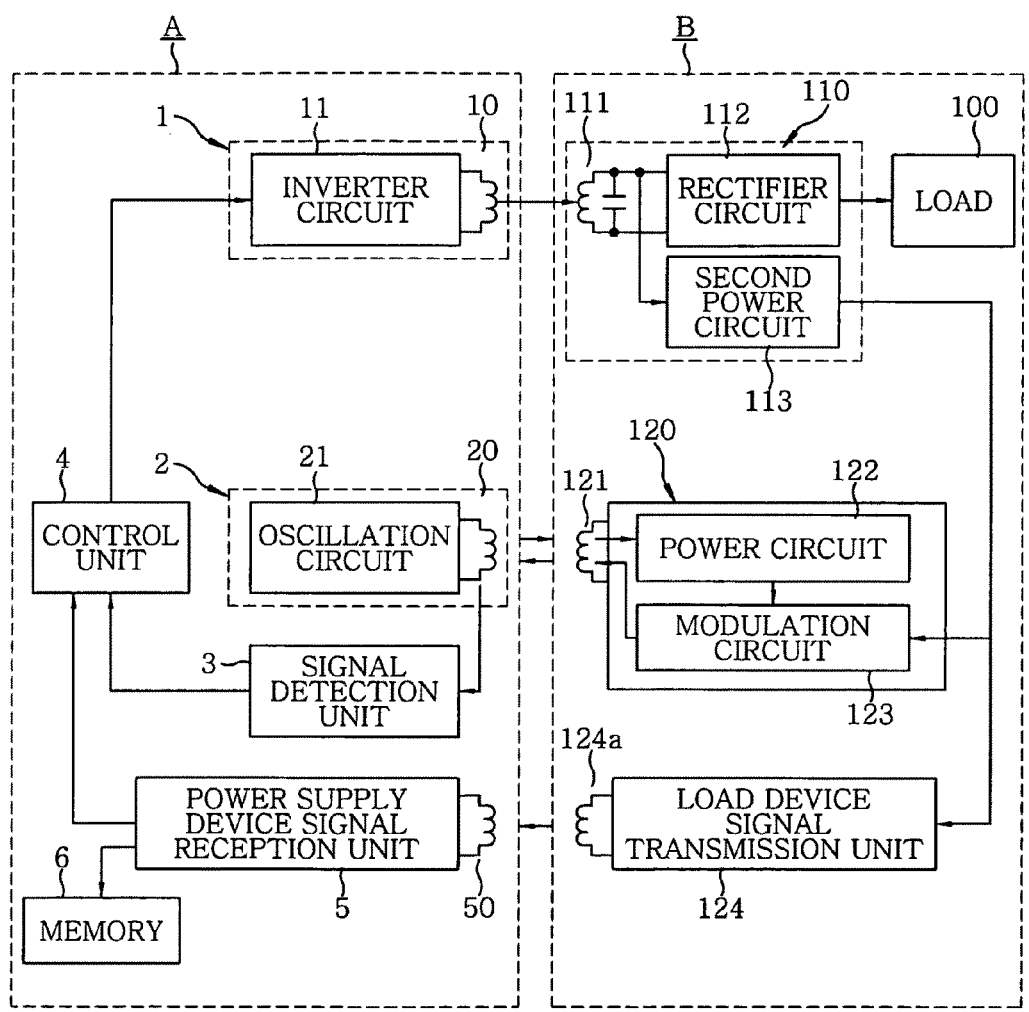
FIG. 14 illustrates a block diagram of a power supply device and a load device in accordance with a fourth embodiment of the present invention.

A non-contact power supply system in accordance with a fourth embodiment of the present invention, as shown in FIG. 14, has a feature that the load device B further includes a second power circuit 113 for producing operation power of the response unit 120 from the high frequency power induced in the secondary power coil 111 and a load device signal transmission unit 124 operated by the power produced in the second power circuit 113 to transmit a transmission signal, and the power supply device A further includes a power supply device side signal reception unit 5 for receiving a signal transmitted from the load device signal transmission unit 124 and a memory 6 for storing information transmitted by the transmission signal.

Further, since other configurations are same as those of the first embodiment, the same components as those of the first embodiment will be assigned with the same reference numerals and explanation thereof will be omitted.

The load device signal transmission unit 124 has a transmission coil 124a and transmits, e.g., a frequency-modulated transmission signal through the transmission coil 124a. The power supply device side signal reception unit 5 has a reception coil 50 magnetically coupled to the transmission coil 124a and recovers original information by demodulating high frequency voltage (frequency-modulated transmission signal) induced in the reception coil 50. The demodulated information is stored in the memory 6. No particular limitation is imposed on the information transmitted from the load device B to the power supply device A by a transmission signal.

As described above, in this embodiment, various information data can be transferred between the load device signal transmission unit 124 and the power supply device side signal reception unit 5.

Fifth Embodiment

Figure 15:
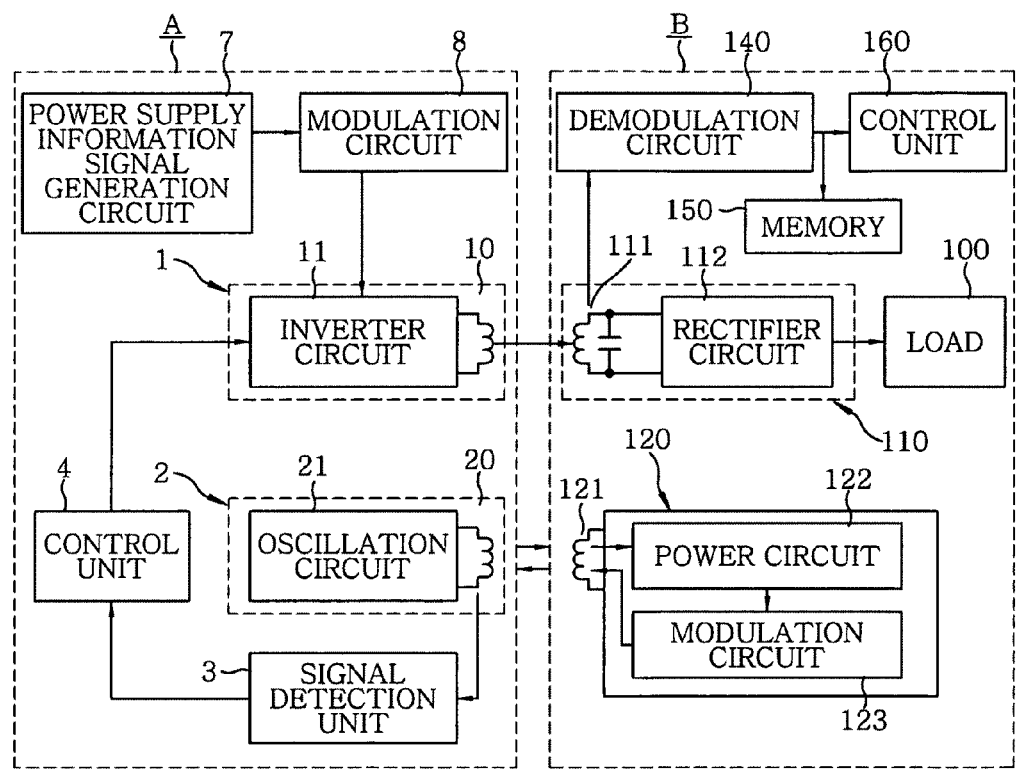
FIG. 15 illustrates a block diagram of a power supply device and a load device in accordance with a fifth embodiment of the present invention.

A non-contact power supply system in accordance with a fifth embodiment of the present invention, as shown in FIG. 15, has a feature that the power supply device A further includes a power supply information signal generation circuit 7 for generating an information signal to be transmitted from the power supply device A to the load device B and a modulation circuit 8 for modulating the high frequency power to be transmitted from the power transmission unit 1 by the information signal, and the load device B further includes a demodulation circuit 140 for demodulating the high frequency power induced in the secondary power coil 111 to recover the information signal, a memory 150 for storing information (information signal) demodulated by the demodulation circuit 140, and a control unit 160 for controlling the load 100 based on the information. Further, since other configurations are same as those of the first embodiment, the same components as those of the first embodiment will be assigned with the same reference numerals and explanation thereof will be omitted.

The modulation circuit 8 performs modulation (amplitude modulation, frequency modulation, or phase modulation) the high frequency voltage (carrier wave) outputted from the inverter circuit 11 by the information signal (base band signal) generated by the power supply information signal generation circuit 7. The demodulation circuit 140 demodulates the high frequency voltage (modulated carrier wave) induced in the secondary power coil 111 to recover the information signal. Further, no particular limitation is imposed on the information transmitted from the power supply device A to the load device B by an information signal.

As described above, various information data can be transferred from the power supply device A to the load device B in this embodiment.

Sixth Embodiment

Figure 16:
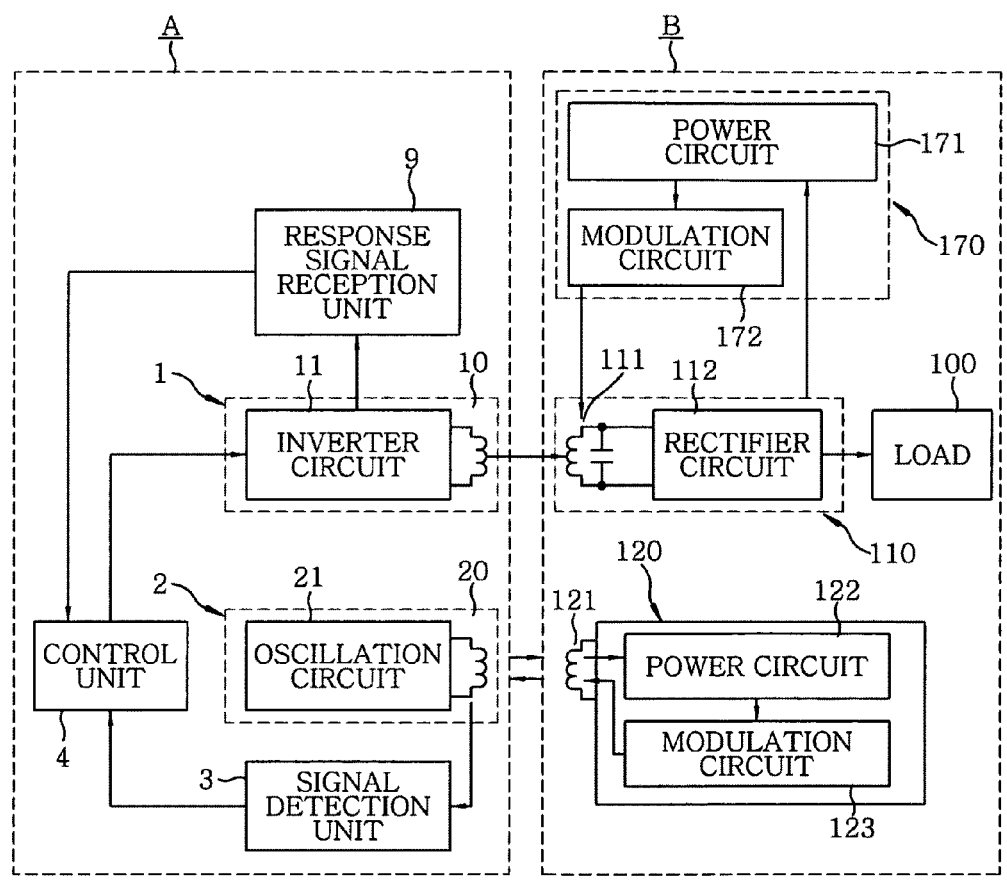
FIG. 16 illustrates a block diagram of a power supply device and a load device in accordance with a sixth embodiment of the present invention.

A non-contact power supply system in accordance with a sixth embodiment of the present invention, as shown in FIG. 16, has a feature that the load device B further includes a response signal transmission unit 170 which is operated by the high frequency power induced in the secondary power coil 111 to transmit a response signal through the secondary power coil 111, and the power supply device A further includes a response signal reception unit 9 for receiving the response signal through the primary power coil 10 magnetically coupled to the secondary power coil 111.

Further, since other configurations are same as those of the first embodiment, the same components as those of the first embodiment will be assigned with the same reference numerals and explanation thereof will be omitted.

The response signal transmission unit 170 has a power circuit 171 for producing operation power from the high frequency power induced in the secondary power coil 111 and a modulation circuit 172 which is operated by the operation power produced in the power circuit 171 to perform modulation (e.g., amplitude modulation) on the induced voltage (carrier wave) of the secondary power coil 111. That is, the response signal transmission unit 170 can transmit a response signal only, when the power is supplied from the power transmission unit 1 of the power supply device A to the power reception unit 110 of the load device B. The response signal transmission unit 170 cannot transmit a response signal when the power is not supplied from the power transmission unit 1 to the power reception unit 110. The response signal transmission unit 170 may continuously or intermittently transmit the response signal.

The response signal reception unit 9 demodulates the response signal by detecting an envelope of the high frequency voltage waveform of the primary power coil 10 to output the demodulated signal to the control unit 4.

In this case, while the power is transmitted from the power transmission unit 1, the signal detection unit 3 is difficult to detect a signal because a large noise component is added to the high frequency voltage waveform generated in the primary signal coil 20. Accordingly, in the first embodiment, the inverter circuit 11 of the power transmission unit 1 is intermittently driven such that the signal detection unit 3 can detect a signal during the pause period of the inverter circuit 11.

On the other hand, in this embodiment, the control unit 4 of the power supply device A continuously executes power transmission of the power transmission unit 1 once the signal detection unit 3 detects a signal representing the presence of the load device B; and the control unit 4 stops the power transmission of the power transmission unit 1 if a period in which the response signal reception unit 9 receives no response signal exceeds a specific period (sufficiently longer than a transmission cycle of the response signal when the response signal is intermittently transmitted) and the control unit 4 continues the power transmission of the power transmission unit 1 if the period in which the response signal reception unit 9 receives no response signal does not exceed the specific period.

Accordingly, in this embodiment, the control, unit 4 continues or stops the power transmission of the power transmission unit 1 based on whether the response signal reception unit 9 receives the response signal transmitted from the response signal transmission unit 170 of the load device B. Thus, even though the detection accuracy of the signal detection unit 3 is reduced during the continuous power transmission of the power transmission unit 1, the inverter circuit 11 of the power transmission unit 1 can be continuously (not intermittently) driven, while preventing malfunction of the power transmission unit 1.

Consequently, there is an advantage of improving power supply efficiency compared to the case in which the inverter circuit 11 is intermittently driven as in the first embodiment.

Seventh Embodiment

Figure 17:
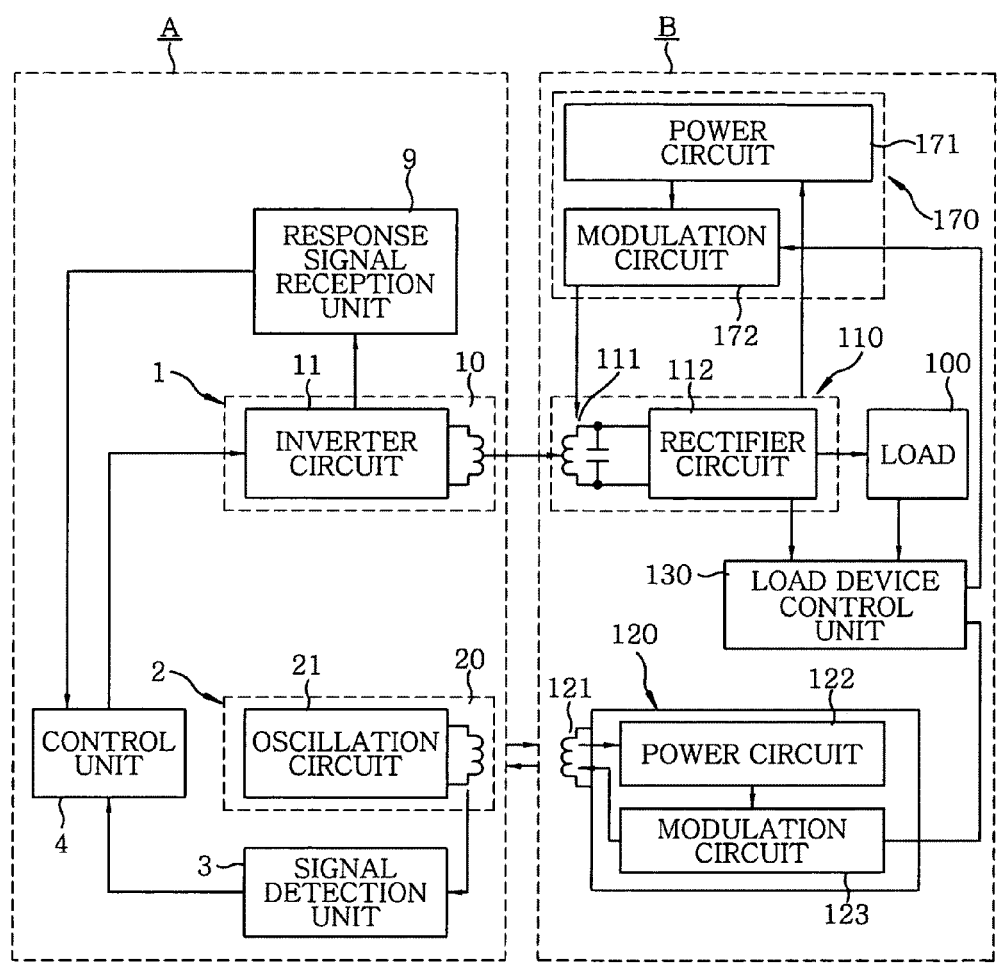
FIG. 17 illustrates a block diagram of a power supply device and a load device in accordance with a seventh embodiment of the present invention.

A non-contact power supply system in accordance with a seventh embodiment of the present invention, as shown in FIG. 17, has a feature that the load device B further includes a load device control unit 130 for transmitting a control command from the response unit 120 and the response signal transmission unit 170 to the control unit 4 of the power supply device A to instruct stop of power transmission of the power transmission unit 1 or reduction of the transmission power level. Further, since other configurations are same as those of the second and the sixth embodiment, the same components as those of the second and the sixth embodiment will be assigned with the same reference numerals and explanation thereof will be omitted.

In the second embodiment, when the secondary battery serving as the load 100 is fully charged, the load device control unit 130 stops the modulation circuit 123 of the response unit 120 such that the signal detection unit 3 of the power supply device A detects no signal. However, as described in the sixth embodiment, when the inverter circuit 11 is continuously driven, the signal detection unit 3 may erroneously detect a noise component as a signal even though the modulation circuit 123 of the response unit 120 is stopped.

Accordingly, in this embodiment, the load device control unit 130 stops both the modulation circuit 123 of the response unit 120 and the modulation circuit 172 of the response signal transmission unit 170 when the secondary battery serving as the load 100 is fully charged. Consequently, the response signal reception unit 9 receives no response signal even when the signal detection unit 3 of the power supply device A detects a wrong signal. Thus, the control unit 4 can stop power transmission of the power transmission unit 1.

As described above, in this embodiment, even when the inverter circuit 11 is continuously driven, it is possible to surely control the power transmission unit 1 by increasing signal transmission reliability.

While the invention has been shown and described with respect to the embodiments, it will be understood by those skilled in the art that various changes and modification may be made without departing from the scope of the invention as defined in the following claims.

What is claimed is:

1. A non-contact power supply system comprising:
a power supply device for transmitting high frequency power; and
a load device which contactlessly receives the high frequency power transmitted from the power supply device by electromagnetic induction to supply the high frequency power to a load,
wherein the power supply device includes a power transmission unit having a primary power coil for power transmission and an inverter circuit for supplying high frequency current to the primary power coil; an inquiry unit having a primary signal coil for receiving a signal from the load device and an oscillation circuit, the primary signal coil being connected between output terminals of the oscillation circuit; a signal detection unit for detecting the signal received by the primary signal coil; and a control unit for controlling the power transmission unit according to the signal detected by the signal detection unit,
wherein the load device includes the load; a power reception unit having a secondary power coil for power reception which is magnetically coupled to the primary power coil and a power conversion unit which converts the high frequency power induced in the secondary power coil into power for the load; a secondary signal coil which is magnetically coupled to the primary signal coil; and a response unit which is operated by an electromotive force induced in the secondary signal coil to transmit the signal from the secondary signal coil,
wherein the control unit of the power supply device does not execute the power transmission from the power transmission unit when the signal detection unit does not detect the signal and executes the power transmission from the power transmission unit when the signal detection unit detects the signal, and
wherein the oscillation circuit of the inquiry unit oscillates at a frequency higher than that of the inverter circuit, and the response unit has a power circuit which produces operation power from a voltage induced in the secondary signal coil and a modulation circuit which is operated by the operation power produced by the power circuit to output a modulation signal of a frequency lower than that of the inverter circuit to the secondary signal coil.

2. The non-contact power supply system of claim 1, wherein the primary power coil and the primary signal coil are substantially coaxially arranged in the power supply device, and the secondary power coil and the secondary signal coil are substantially coaxially arranged in the load device.

3. The non-contact power supply system of claim 1, wherein the control unit of the power supply device drives the inverter circuit intermittently, when it executes the power transmission from the power transmission unit and stops the power transmission from the power transmission unit if the signal detection unit does not detect the signal during a pause period of the inverter circuit.

4. The non-contact power supply system of claim 3, wherein the signal is an amplitude modulated signal and the signal detection unit of the power supply device detects an envelope of voltage induced in the primary signal coil and determines that the signal is detected if a detected voltage level exceeds a threshold value.

5. The non-contact power supply system of claim 1, wherein the load device includes a load device control unit for transmitting a control command from the response unit to the control unit of the power supply device to instruct stop of the power transmission from the power transmission unit or reduction of transmission power.

6. The non-contact power supply system of claim 1, wherein the control unit of the power supply device does not execute the power transmission from the power transmission unit if a signal level detected by the signal detection unit is constant.

7. The non-contact power supply system of claim 1, wherein the modulation circuit produces the signal modulated by varying an impedance of an impedance element connected between the two ends of the secondary signal coil.

8. The non-contact power supply system of claim 1, wherein the power reception unit of the load device further has a power circuit for producing operation power of the response unit from the high frequency power induced in the secondary power coil.

9. The non-contact power supply system of claim 1, wherein the signal detection unit of the power supply device further has one or more additional primary signal coils.

10. The non-contact power supply system of claim 1, further comprising additional one or more load devices, wherein the load device and the additional load devices have different types of loads and response units of the load device and the additional load devices transmit and receive signals of different frequencies according to the types of the loads, and
wherein the inquiry unit of the power supply device allows the oscillation circuit to oscillate at frequencies varying according to the types of the load device and the additional load devices.

11. The non-contact power supply system of claim 1, wherein the load device further includes an additional power circuit for producing operation power of the response unit from high frequency power induced in the secondary power coil and a load device signal transmission unit operated by the power produced by the additional power circuit to transmit a transmission signal, and the power supply device includes a power supply device signal reception unit for receiving the transmission signal from the load device signal transmission unit.

12. The non-contact power supply system of claim 1, wherein the power supply device further includes a modulation circuit for modulating the high frequency power from the power transmission unit by an information signal and the load device further includes a demodulation circuit for demodulating high frequency power induced in the secondary power coil to recover the information signal.

13. The non-contact power supply system of claim 1, wherein the oscillation circuit oscillates intermittently while the signal detection unit does not detect the signal and the oscillation circuit continuously oscillates if the signal detection unit detects the signal.

14. The non-contact power supply system of claim 2, wherein an inner and an outer diameter of the primary signal coil are substantially identical to those of the secondary signal coil and the inner diameter of the secondary signal coil is larger than an outer diameter of the secondary power coil.

15. The non-contact power supply system of claim 2, wherein the primary signal coil and the secondary signal coil are arranged between the primary power coil and the secondary power coil while the primary power coil and the secondary power coil are magnetically coupled to each other.

16. The non-contact power supply system of claim 1, wherein the load device includes a response signal transmission unit which is operated by the high frequency power induced in the secondary power coil to transmit a response signal through the secondary power coil,
    wherein the power supply device includes a response signal reception unit for receiving the response signal through the primary power coil magnetically coupled to the secondary power coil, and
    wherein when the control unit of the power supply device executes the power transmission from the power transmission unit according to the signal detected by the signal detection unit, the control unit stops the power transmission from the power transmission unit if a period in which the response signal reception unit receives no response signal exceeds a specific period and the control unit continues the power transmission from the power transmission unit if the period in which the response signal reception unit receives no response signal does not exceed the specific period.

17. The non-contact power supply system of claim 16, wherein the load device includes a load device control unit for transmitting a control command from the response unit and the response signal transmission unit to the control unit of the power supply device to instruct stop of the power transmission from the power transmission unit or reduction of transmission power.

* * * * *